Figure 1:
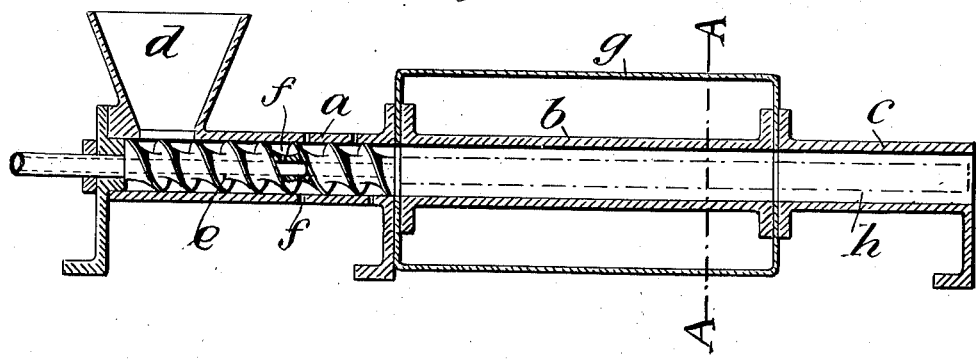

T. GARE.
APPARATUS FOR THE MANUFACTURE OF RUBBER ARTICLES FROM OLD OR WASTE RUBBER.
APPLICATION FILED JULY 2, 1908.

1,002,667. Patented Sept. 5, 1911.

Witnesses

Inventor
Thomas Gare
Per James L. Norris
Attorney.

UNITED STATES PATENT OFFICE.

THOMAS GARE, OF NEW BRIGHTON, ENGLAND.

APPARATUS FOR THE MANUFACTURE OF RUBBER ARTICLES FROM OLD OR WASTE RUBBER.

1,002,667.  Specification of Letters Patent.  Patented Sept. 5, 1911.

Application filed July 2, 1908. Serial No. 441,643.

*To all whom it may concern:*

Be it known that I, THOMAS GARE, a subject of the King of Great Britain, residing at New Brighton, in the county of Chester, England, have invented new and useful Improvements in Apparatus for the Manufacture of Rubber Articles from Old or Waste Rubber, of which the following is a specification.

My present invention relates to improvements upon an invention for which I have British Letters Patent No. 12454 of 1906 and United States Patent No. 967,751 and the object is to provide means for producing by the process described in the specification belonging to the said application, india rubber articles such as solid or tubular tires, disks and the like, by forcing the rubber mass continuously from a cylindrical casing or die of suitable section.

The features which mainly distinguish my present invention from my said prior invention are the means by which the powdered or reduced waste rubber is pressed together and forced through a mold or die together with means for freeing the rubber from air while being pressed together and before being heated.

In the process forming the subject of my said prior invention it is necessary in order to preserve the original character of the powdered rubber, before submitting it to the action of heat to have it compressed under high pressure so that it is in a compact mass free from air, and I have found in practice that if the powdered rubber is forced by means of a piston through a chamber uniform in cross section, say a cylinder and suitable heat applied at a point or part of the cylinder sufficient compression of the rubber particles to get rid of the air cannot be obtained and the resulting product is useless. On the other hand if resistance to the travel of the rubber powder in the cylinder is provided sufficient to enable the piston to properly compress the powdered rubber say by reducing the cross sectional area of the cylinder or by having the cylinder bent at right angles then I have found in practice that the compressed mass of powdered rubber cannot be forced onward even under very high pressure from the piston.

According to my present invention I employ a feeding screw rotating in a cylindrical casing whereby I am able to feed the powdered rubber to the mold or die where it is heated to the required degree while the friction between the powdered rubber in the feeding screw and the casing retards the forward travel of the rubber sufficiently to effect the necessary degree of compression to free the mass from air, the air being permitted to escape through holes in the cylindrical casing or in the surface of the screw if a hollow screw be used. I attain these objects by the means illustrated in the accompanying drawing, in which—

Figure 2:
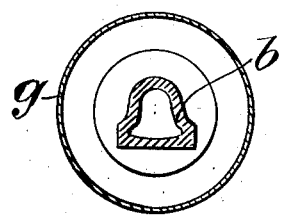
Figure 3:
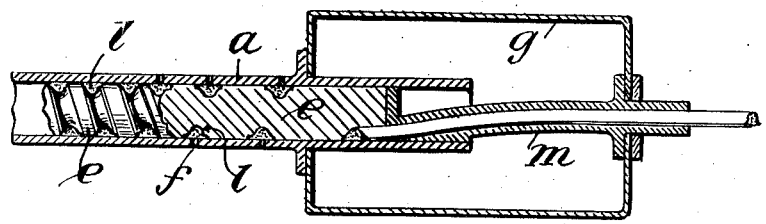
Figure 4:
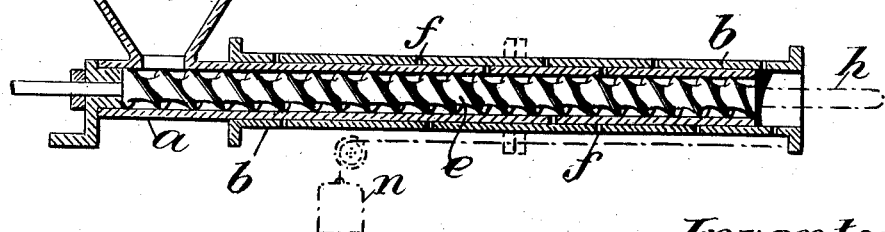

Figure 1 is a longitudinal section and Fig. 2 a cross section thereof on line A—A of an apparatus constructed in accordance with one embodiment of my invention. Figs. 3 and 4 are longitudinal sections of two other embodiments of my invention.

In carrying out my invention and referring to Figs. 1 and 2, $a$ is a cylindrical casing inside of which a feed screw $e$ rotates. The feed end of the casing $a$ is provided with a hopper $d$. The screw $e$ is fed from the said hopper with powdered old or waste india rubber in a dry non-plastic state. This screw extends along the casing $a$ and holes $f$ are formed in the wall of the casing $a$ or screw $e$ or in both for the air to escape from the rubber as it is being pressed together and fed toward the compacting tube $b$ where it is subjected to heat and takes the desired cross sectional shape and is then cooled while passing through the die $c$ either by water or a current of air as is well understood, when the article will be finished. When forming air holes $f$ in the screw $e$, the latter is made hollow for the air to leave through the center of the screw at the outer end thereof.

The rubber is shaped in the compacting tube $b$ and to shape it gradually the latter may be tapered from a circular cross section where it adjoins the part $a$ to the point, for instance at A—A, where the cross section of the mold corresponds with the shape which the rubber is desired to take.

The die $c$ must be of such cross sectional area and shape as not to unduly retard the travel of the material after it has been fused and shaped and at the end next the compacting tube the die $c$ is preferably, and in cases where the material is in a state of fusion at this point necessarily, formed to correspond in internal cross section though it may be enlarged or altered in shape toward the other end where the material becomes cooler and is set to the desired shape. Thus by modifying the parts $b$ and $c$ articles of various cross sectional shapes can be produced. The said tubular mold may be made in 3 sections and bolted together as shown, the middle part or compacting tube section $b$ being surrounded by a jacket $g$ to confine the heat around it, which heat may be generated by a Bunsen burner or any other suitable means.

To the delivery end of the screw $e$ a stud or mandrel $h$, see dotted lines, may be secured forming a core, around which the rubber will spread and thereby produce a tubular article instead of a solid one.

Referring to Fig. 3 according to another embodiment of my invention, for producing solid articles, say for instance a tire, I may form the space $l$ between the threads of the screw $e$ of a section corresponding with the section of the article to be produced and thereby cause the screw to present the compressed powdered rubber to the mold part in the form which it is desired to assume. The feed end of the casing $a$ of the screw is also provided with a hopper such as shown in Fig. 1 and its delivery end with a heat jacket $g$. In this embodiment, the thread of the screw $e$ may increase in pitch from the feed to the delivery end of the apparatus in order to reduce the friction of the molded rubber at the delivery end or die $m$ of the apparatus where it is heated and to insure a central delivery. For the latter purpose a die $m$ is secured to the delivery end of the screw $e$, the inner end of which communicates with the end of the screw thread space $l$ and the outer end of which is central with the screw $e$ and adapted to rotate in the jacket $g$.

In some cases I may complete the whole operation, that is to say, completely finish the article in the hereinbefore described apparatus; or to produce, say a tire endless and thus obviate the joining afterward, I may after having pressed together the rubber only agglutinate the rubber particles in the said apparatus and then place a portion of the thus partly treated material in and lock it into an annular or other suitably shaped mold of corresponding section and afterward subject it therein to the desired heat as will be readily understood without illustration.

Referring to Fig. 4 according to another embodiment of my invention, I may employ a cylindrical mold $b$ in connection with a screw $e$ the mold being allowed to slide slowly away from the screw as the rubber is fed in and sufficiently compressed or vice versa. In this case the mold $b$ which has also holes $f$ for the escape of air and may be formed in sections, is placed over the casing $a$ and by means of a weight $n$ or its equivalent the required amount of compression is obtained. For producing tubular articles in this case the screw $e$ may also be provided with a stud or mandrel $h$, as shown in dotted lines. After this mold has been filled as described, the ends thereof and the said air holes are plugged and the mold then placed in an oven and subjected to the desired temperature. In some cases I may place a canvas tube inside the tube $b$ or use a canvas tube in place of the latter and thereby produce canvas covered rubber. It will be obvious that the powdered rubber used may be adulterated with fibrous material or oil as is customary in ordinary rubber manufacture and in which case I may add a small percentage of sulfur.

I am aware that it has been proposed to manufacture articles of rubber such as stamps, tubes, bars, felt and cable coverings from regenerated rubber or from raw rubber or rubber compounds by forcing granulated material by means of a piston through a heated tube and I make no claim to any apparatus so constructed.

I claim:

1. An apparatus for the reforming of rubber articles from powdered waste rubber by forcing, comprising a solid single wall cylindrical casing having an inlet for the powdered waste rubber, a screw in the said casing fitting it and receiving and pressing the said rubber while cold and perforations in the walls of the said casing in front of the said inlet for the escape of the air from the rubber while being pressed, all combined substantially as and for the purpose set forth.

2. An apparatus for the reforming of rubber articles from powdered waste rubber by forcing, comprising a solid single wall cylindrical casing having an inlet for powdered waste rubber, a screw in the said casing fitting it and receiving and pressing the said rubber while cold, perforations in the wall of the said casing in front of the said inlet for the escape of air from the rubber while being pressed, a tube in alinement with and forming a continuation of the said casing into which the pressed rubber is forced by the said screw, the section of the inlet orifice of the said tube corresponding with that of the outlet orifice of the said casing and the section of the outlet orifice of the said tube with that of the article to be produced and means for heating and thereby reforming the rubber pressed into and forced through the said tube, all combined substantially as and for the purpose set forth.

3. An apparatus for the reforming of rubber articles from powedered waste rubber by forcing, comprising a single wall cylindrical casing having an inlet for the powdered waste rubber, a screw in the said cylindrical casing fitting it and with thread spaces corresponding in section with the section of the rubber articles to be produced for receiving and pressing the said rubber while cold, and means in the said casing in front of the said inlet for the escape of the air from the rubber while being pressed, all substantially as and for the purpose set forth.

4. An apparatus for the reforming of rubber articles from powdered waste rubber by forcing, comprising a single wall cylindrical casing having an inlet for the powdered waste rubber, a screw in the said cylindrical casing fitting it and with thread spaces corresponding in section with the section of the rubber articles to be produced for receiving and pressing the said rubber while cold, means in the said casing in front of the said inlet for the escape of the air from the rubber while being pressed, and a nozzle secured to the delivery end of the said screw the inner end of which communicates with the delivery end of the thread space and the outer end of which is concentric with the said screw, all combined substantially as and for the purpose set forth.

5. An apparatus for the reforming of rubber articles from powdered waste rubber by forcing, comprising a single wall cylindrical casing having an inlet for the powdered waste rubber, a screw in the said cylindrical casing fitting it and with thread spaces corresponding in section with the section of the rubber articles to be produced for receiving and pressing the said rubber while cold, means in the said casing in front of the said inlet for the escape of the air from the rubber while being pressed, a nozzle secured to the delivery end of the said screw the inner end of which communicates with the delivery end of the thread space and the outer end of which is concentric with the said screw, and means for heating and thereby reforming the shaped and pressed rubber in the delivery part of the said screw, all combined substantially as and for the purpose set forth.

In testimony whereof I have signed my name to this specification in the presence of two subscribing witnesses.

THOMAS GARE.

Witnesses:
ALFRED BOSSHARDT,
STANLEY E. BRAMALL.